(12) United States Patent
Schulz et al.

(10) Patent No.: US 12,351,233 B2
(45) Date of Patent: Jul. 8, 2025

(54) STEER BY WIRE STEERING COLUMN WITH STATIONARY WHEEL HUB

(71) Applicant: Steering Solutions IP Holding Corporation, Saginaw, MI (US)

(72) Inventors: John F. Schulz, Hemlock, MI (US); Randy W. Jones, North Branch, MI (US); Michael P. Anspaugh, Bay City, MI (US); Sergio R. Molinar, Freeland, MI (US); Jacob Caverly, Freeland, MI (US); Todd M. King, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/504,700

(22) Filed: Nov. 8, 2023

(65) Prior Publication Data

US 2025/0145208 A1    May 8, 2025

(51) Int. Cl.
| | |
|---|---|
| *B62D 1/19* | (2006.01) |
| *B60K 35/10* | (2024.01) |
| *B60K 35/60* | (2024.01) |
| *B60K 35/65* | (2024.01) |
| *B62D 1/04* | (2006.01) |
| *B62D 1/185* | (2006.01) |
| *B62D 5/00* | (2006.01) |
| *B62D 15/02* | (2006.01) |

(52) U.S. Cl.
CPC ............ *B62D 1/192* (2013.01); *B60K 35/10* (2024.01); *B62D 1/046* (2013.01); *B62D 1/185* (2013.01); *B62D 5/001* (2013.01); *B62D 15/022* (2013.01); *B60K 35/60* (2024.01); *B60K 35/654* (2024.01); *B60K 2360/128* (2024.01); *B60K 2360/131* (2024.01); *B60K 2360/782* (2024.01)

(58) Field of Classification Search
CPC ........ B62D 1/163; B62D 1/192; B62D 1/046; B62D 1/185; B62D 5/001; B62D 15/022; B62D 1/195; B62D 1/19; B60K 35/10; B60K 35/60; B60K 35/654; B60K 2360/128; B60K 2360/131; B60K 2360/782
See application file for complete search history.

(56) References Cited

U.S. PATENT DOCUMENTS

| | | | |
|---|---|---|---|
| 7,651,124 B2* | 1/2010 | Gulde | B62D 1/105 |
| | | | 180/402 |
| 11,999,407 B1* | 6/2024 | Soderlind | B62D 1/181 |
| 2003/0164060 A1* | 9/2003 | Menjak | B62D 5/006 |
| | | | 74/552 |
| 2005/0046279 A1* | 3/2005 | Dunn | B60Q 1/0082 |
| | | | 307/10.8 |

(Continued)

*Primary Examiner* — Paul N Dickson
*Assistant Examiner* — Shams Dhanani
(74) *Attorney, Agent, or Firm* — Dickinson Wright PLLC

(57) ABSTRACT

A steering column assembly includes a steering wheel having a steering wheel rim, a steering wheel hub, and a rim extension segment. The steering column assembly also includes a motor operatively coupled to the rim extension segment. The steering column assembly further includes a jacket assembly operatively coupled to the steering wheel, wherein the jacket assembly defines a central passage extending in a longitudinal direction of the steering column assembly, wherein the central passage does not include a steering shaft therein.

12 Claims, 6 Drawing Sheets

(56) References Cited

U.S. PATENT DOCUMENTS

| | | | | |
|---|---|---|---|---|
| 2006/0162485 A1* | 7/2006 | Leng | ...................... | B62D 1/046 |
| | | | | 74/552 |
| 2009/0223789 A1* | 9/2009 | Ballard | .................. | B62D 1/046 |
| | | | | 200/61.54 |
| 2018/0105196 A1* | 4/2018 | Bodtker | ................. | B62D 1/192 |
| 2021/0155279 A1* | 5/2021 | Dubay | .................. | B62D 1/181 |
| 2023/0249739 A1* | 8/2023 | Schulz | .................. | B62D 1/192 |
| | | | | 74/43 |

\* cited by examiner

STEER BY WIRE STEERING COLUMN WITH STATIONARY WHEEL HUB

TECHNICAL FIELD

The following description relates to vehicle steering systems and, more particularly, to a steer-by-wire steering column with a stationary wheel hub.

BACKGROUND

A vehicle, such as a car, truck, sport utility vehicle, crossover, mini-van, marine craft, aircraft, all-terrain vehicle, recreational vehicle, or other suitable vehicles, include various steering system schemes. Adjustable rake and translation steering columns typically have upper and lower jackets, as well as upper and lower steering shafts. A mechanical connection in the form of the aforementioned upper and lower shafts and an intermediate shaft is needed in traditional steering columns based on the need to operatively connect a steering wheel to an output steering gear, which causes adjustment of road wheels for steering maneuvers. In newer steer-by-wire column systems, the steering wheel hub typically rotates which leads to more complicated assemblies being required to accommodate airbag systems, crash stroke systems and additional design and positioning considerations for componentry such as turn signal levers, transmission shift levers and the like. Additionally, complications arise for wiring routed throughout the steering column when dealing with a stationary wheel hub.

SUMMARY

According to one aspect of the disclosure, a steering column assembly includes a steering wheel having a steering wheel rim, a steering wheel hub, and a rim extension segment. The steering column assembly also includes a motor operatively coupled to the rim extension segment. The steering column assembly further includes a jacket assembly operatively coupled to the steering wheel, wherein the jacket assembly defines a central passage extending in a longitudinal direction of the steering column assembly, wherein the central passage does not include a steering shaft therein.

According to another aspect of the disclosure, a steering column assembly includes a steering wheel having a steering wheel rim and a steering wheel hub, wherein the steering wheel hub does not rotate. The steering column assembly also includes a jacket assembly, wherein the jacket assembly does not include a steering shaft disposed therein.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The Figures illustrate embodiments of a steering column assembly with a stationary wheel hub and which eliminates the need for one or more steering shafts. The steering column assembly may be used in any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as aircrafts, boats, trains, drones, or other vehicles. The steering column assembly may be configured as a driver interface steering system, an autonomous driving system, or a system that allows for both driver interface and autonomous steering.

Figure 1:
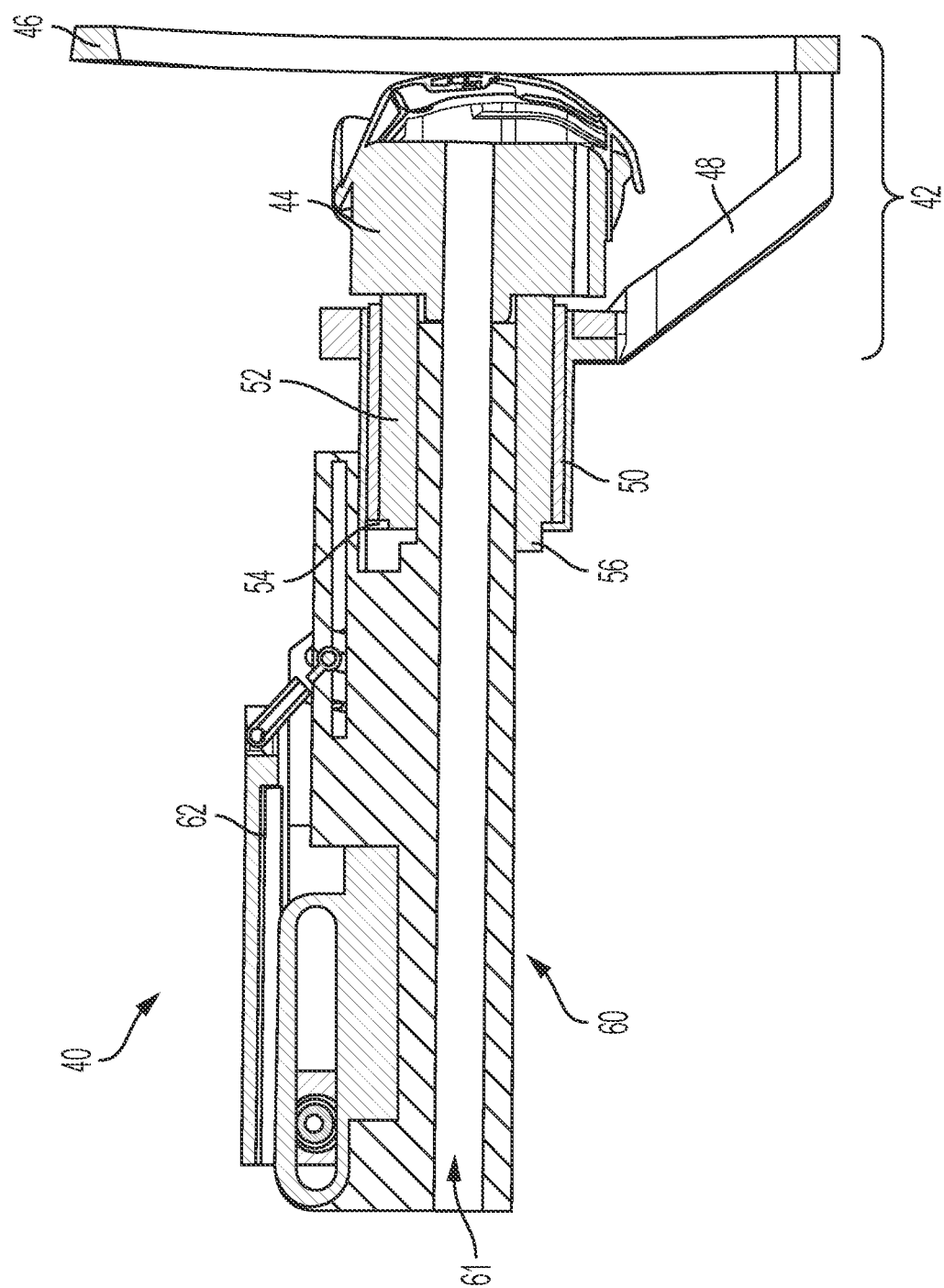
FIG. 1 is a side, elevation view of a steering column assembly.

Referring to FIG. 1, the steering column assembly is generally referenced with numeral 40. The steering column assembly includes a steering wheel 42, wherein a driver may mechanically provide a steering input by turning the steering wheel 42. The steering column assembly 40 is a steer-by-wire type of steering system. Therefore, the steering column assembly 40 does not include a continuous mechanical connection between the steering wheel 42 and an output gear which causes physical adjustment of road wheels for steering maneuvers. Even in prior steer-by-wire systems, one or more steering shafts have been utilized to operatively couple the steering wheel 42 to another component, such as an actuator or the like. However, the embodiments disclosed herein eliminate the need for even a single steering shaft.

The steering wheel 42 includes a steering wheel hub 44 and a steering wheel rim 46. As disclosed herein, while the steering wheel rim 46 rotates during use, the steering wheel hub 44 remains rotationally stationary. The steering wheel rim 46 includes a rim extension segment 48 which may be integrally formed with the steering wheel rim 46 or coupled to the rim 46. The rim extension segment 48 is operatively coupled to or integrally formed with a motor rotor 50. The steering wheel rim 46, the rim extension segment 48 and the motor rotor 50 (and potentially any suitable intervening components or hardware) are the only components which rotate in direct response to rotation of the steering wheel 42.

The steering column assembly 40 also includes a motor stator 52 disposed radially inwardly of the motor rotor 50. One or more bearings 54 are provided to guide controlled rotation of the motor rotor 50. One or more position sensors 56 may be mounted to either side or end of the motor stator 52 to detect a rotational position of the motor rotor 50 and therefore the steering wheel 42. A jacket assembly 60 is provided to structurally couple the steering column assembly 40 to the vehicle via a mounting bracket 62 or another stationary structural feature. It is noted that the motor stator 52, the jacket assembly 60 and the steering wheel hub 44 remain rotationally stationary relative to the steering wheel 42 during use.

As described above, the steering column assembly 40 has eliminated the inclusion of even a single steering shaft. Such a component is typically located within the jacket assembly 60. Based on the elimination of the steering shaft and the rotationally stationary condition of the steering wheel hub 44, various wires for assemblies and sub-components such as an air bag and steering wheel control features are routed throughout a central passage 61 defined by the jacket assembly 60 and overall steering column assembly 40, but do not require a SIR coil. The elimination of the steering shaft(s) and SIR coil reduce part count, system complexity and overall cost. The central passage 61 extends in a longitudinal direction of the steering column assembly 40.

Figure 2:
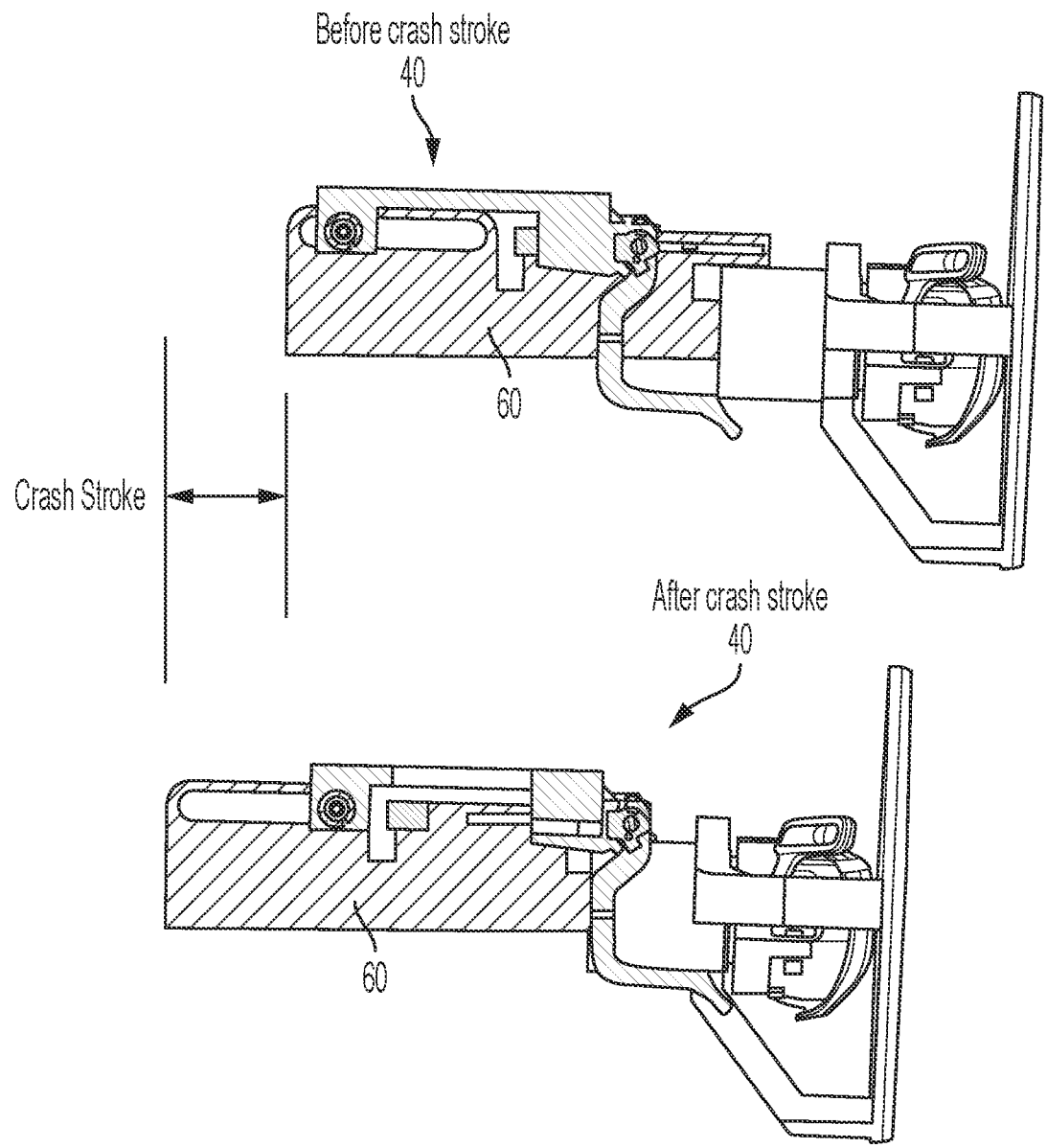
FIG. 2 is a side, elevation view of the steering column assembly according to one aspect of the disclosure illustrated in a first position and a crash stroke position.
Figure 3:
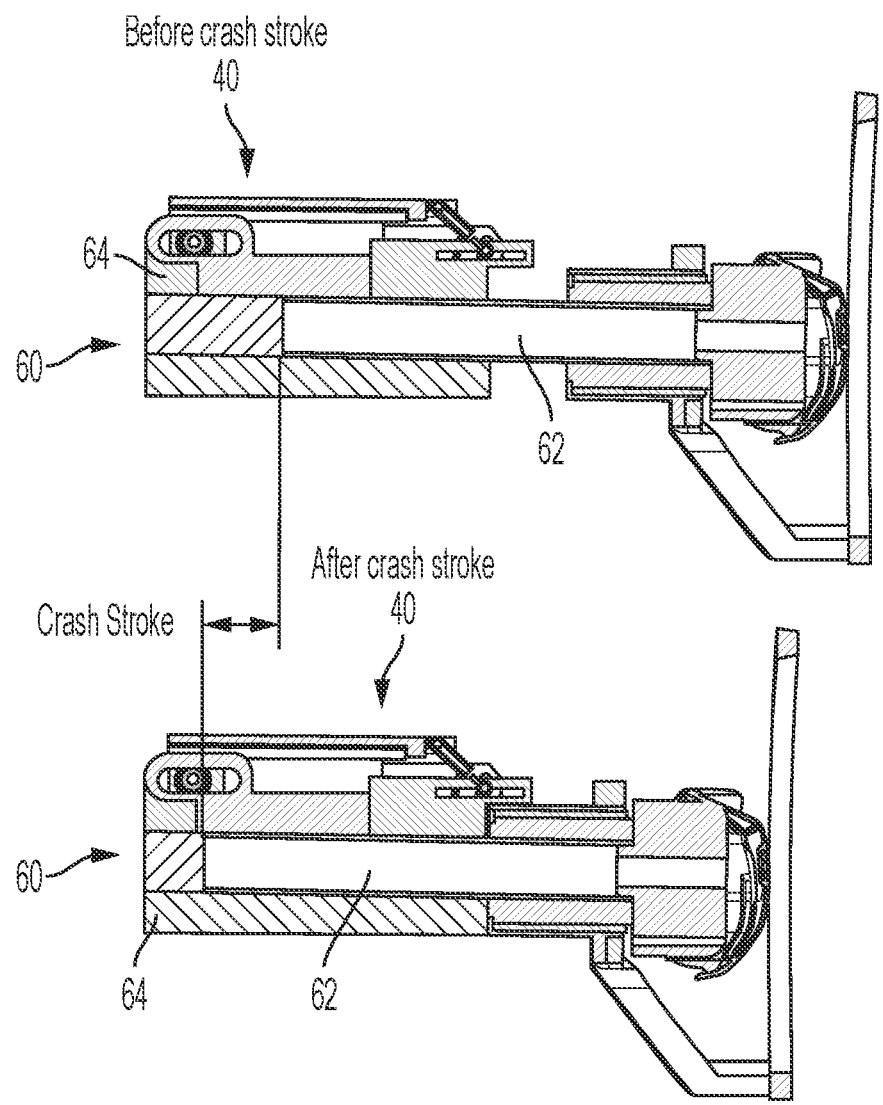
FIG. 3 is a side, elevation view of the steering column assembly according to another aspect of the disclosure illustrated in a first position and a crash stroke position.
Figure 4:
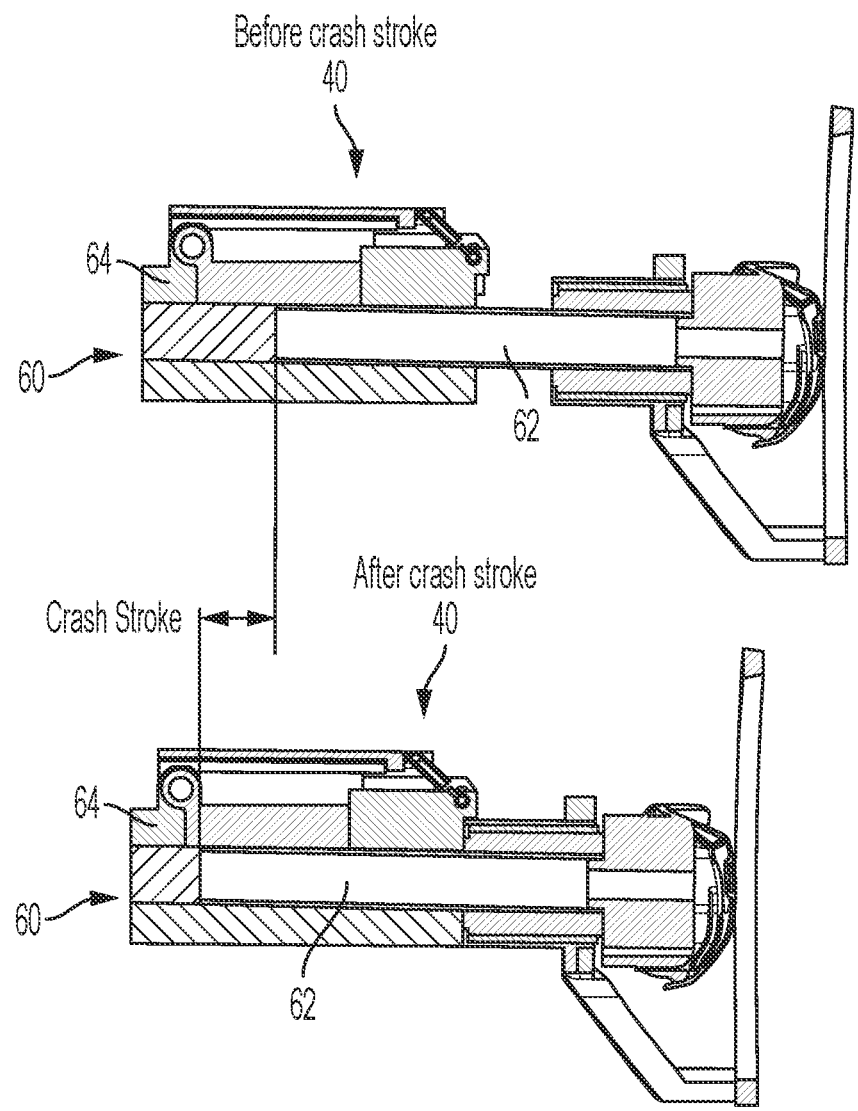
FIG. 4 is a side, elevation view of the steering column assembly according to another aspect of the disclosure illustrated in a first position and a crash stroke position.

Referring now to FIGS. 2-4, various embodiments of the jacket assembly 60 of the steering column assembly 40 are illustrated in a first axial position and a second axial position. The first axial position represents a position of the steering column assembly 40 during normal operation which allows axial adjustment of the steering column assembly 40 over a range of axial positions. The second axial position represents movement of the steering column assembly to an energy absorption condition which may be referred to as a "crash position".

As shown in FIG. 2, the jacket assembly 60 is a single, integrally formed jacket. The single jacket translates in both normal axial adjustment and during a "crash stroke" event. FIGS. 3 and 4 illustrate embodiments of the jacket assembly 60 with two jackets, which may be referred to herein as a first jacket 62 and a second jacket 64, or an upper jacket 62 and a lower jacket 64. In particular, FIG. 3 shows a dual jacket assembly where both jackets translate during normal axial adjustment, but the lower jacket is stationary during a "crash stroke" event. FIG. 4 shows a dual jacket assembly where the lower jacket 64 remains stationary and the upper jacket 62 translates during normal axial adjustment and during a "crash stroke" event.

Referring now to FIGS. 5-8, various embodiments of control input features are illustrated. Since certain control input features, such as turn signal and windshield wiper stalks, must remain rotationally stationary (i.e., do not rotate with steering wheel) the control input features cannot be mounted immediately behind the steering wheel in the manner typically done in prior systems since the embodiments disclosed herein require this portion (i.e., rim extension segment 48 and/or motor rotor components 50) to rotate with the steering wheel 42. FIGS. 5-8 depict various alternative mounting locations for the control input features for the disclosed embodiments.

Figure 6:
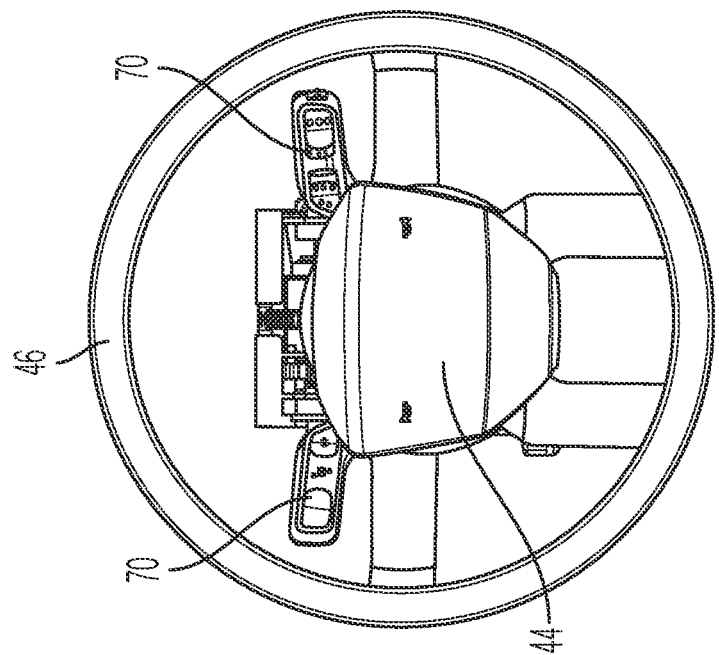
FIG. 6 is an end view of the steering column assembly illustrating control input features mounted to the first location.
Figure 5:
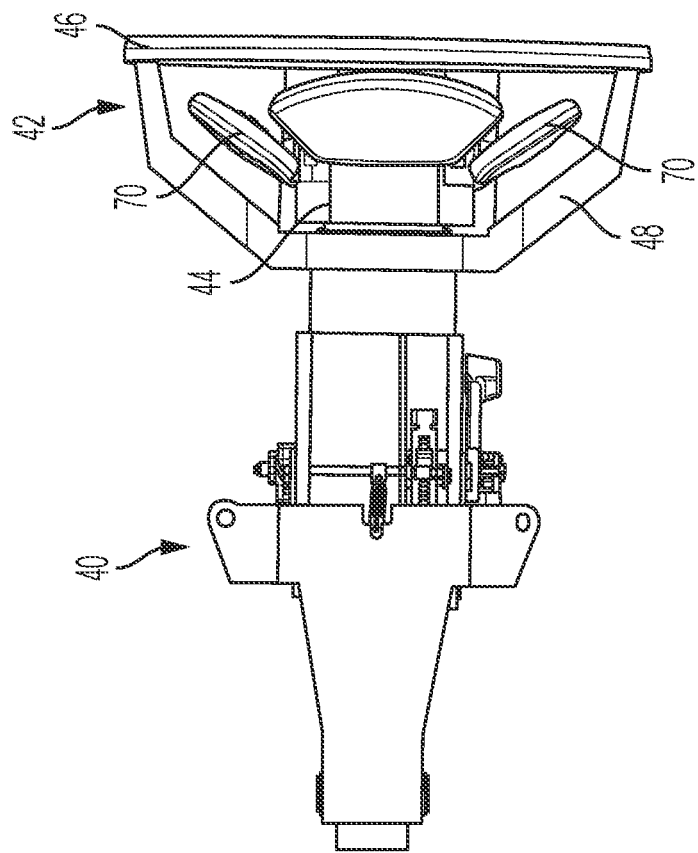
FIG. 5 is a plan view of the steering column assembly illustrating control input features mounted to a first location.
Figure 8:
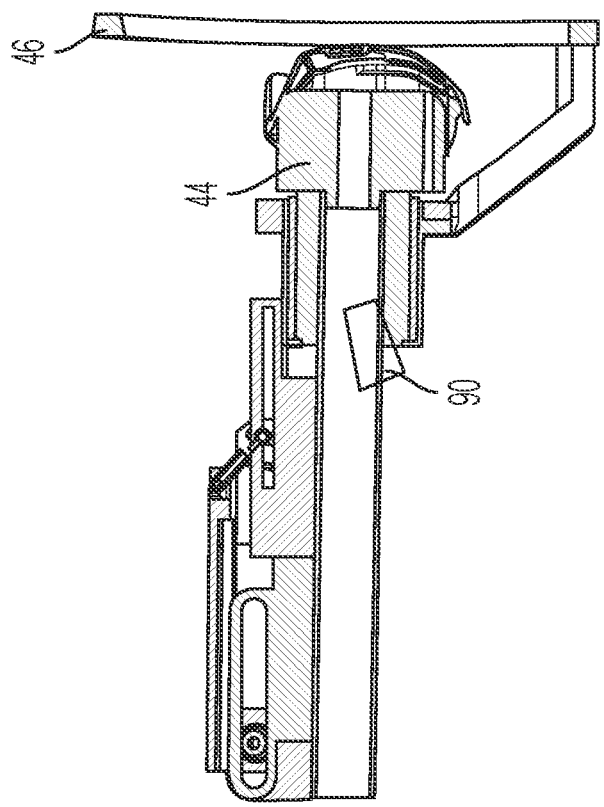
FIG. 8 is a side, elevation view of the steering column assembly illustrating control input features mounted to a third location.
Figure 7:
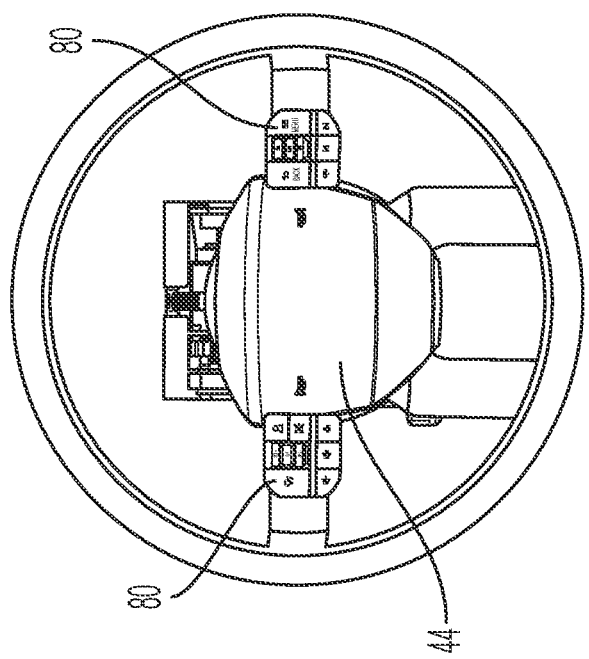
FIG. 7 is an end view of the steering column assembly illustrating control input features mounted to a second location.

FIGS. 5 and 6 illustrate control input features, namely stalks 70, which are mounted to the steering wheel hub 44, but within the steering wheel rim 46. The stalks 70 may be mounted beside an air bag, for example. In the embodiment shown in FIG. 7, the stalks may be replaced with buttons 80 or the like for activating turn signals. In such an embodiment, the buttons 80 may be located anywhere on the stationary steering wheel hub 44. In the embodiment of FIG. 7, a position sensor may shut off the turn signal at the proper time. FIG. 8 illustrates another embodiment to provide the ability to mount the stalks 70 to non-rotating structure beyond the steering wheel rim 46. In particular, the stalks 70 are attached to a bracket 90 to the jacket assembly 60 and extend the bracket 90 to a location suitable for mounting of the stalks 70.

The embodiments disclosed herein beneficially include a steering wheel hub which does not rotate, thereby remaining stationary, as well as eliminate the need for even a single steering shaft disposed within the jacket assembly. These features result in a simplified design with fewer parts.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steering column assembly comprising:
    a steering wheel having a steering wheel rim, a steering wheel hub, and a rim extension segment;
    a motor having a motor rotor operatively coupled to the rim extension segment;
    a jacket assembly operatively coupled to the steering wheel, wherein the jacket assembly defines a central passage extending in a longitudinal direction of the steering column assembly, wherein the central passage does not include a steering shaft therein, wherein the jacket assembly consists of a single, integrally formed jacket which translates during normal axial adjustment of the steering column assembly and during a crash stroke event of the steering column assembly; and
    a motor stator disposed radially inwardly of the motor rotor to be positioned between the motor rotor and the single, integrally formed jacket.

2. The steering column assembly of claim 1, further comprising a plurality of wires extending through the central passage of the jacket assembly.

3. A steering column assembly comprising:
    a steering wheel having a steering wheel rim, a steering wheel hub, and a rim extension segment;
    a motor having a motor rotor operatively coupled to the rim extension segment;
    a jacket assembly operatively coupled to the steering wheel, wherein the jacket assembly defines a central passage extending in a longitudinal direction of the steering column assembly, wherein the central passage does not include a steering shaft therein, wherein the jacket assembly comprises an upper jacket and a lower jacket, wherein the upper jacket and the lower jacket each translate during normal axial adjustment of the steering column assembly, wherein the lower jacket is stationary during a crash stroke event of the steering column assembly; and a motor stator disposed radially inwardly of the motor rotor to be positioned between the motor rotor and the upper jacket.

4. The steering column assembly of claim 3, wherein the lower jacket remains stationary and the upper jacket translates during normal axial adjustment of the steering column assembly and during a crash stroke event of the steering column assembly.

5. The steering column assembly of claim 1, wherein the steering wheel hub is rotationally stationary relative to the steering wheel rim.

6. The steering column assembly of claim 5, wherein an input control feature is a stalk mounted to the steering wheel hub.

7. The steering column assembly of claim 5, wherein an input control feature is a button mounted to the steering wheel hub.

8. The steering column assembly of claim 1, wherein an input control feature is a stalk attached to a mounting bracket operatively coupled to the jacket assembly.

9. The steering column assembly of claim 3, wherein the steering wheel hub is rotationally stationary relative to the steering wheel rim.

10. The steering column assembly of claim 9, wherein an input control feature is a stalk mounted to the steering wheel hub.

11. The steering column assembly of claim 9, wherein an input control feature is a button mounted to the steering wheel hub.

12. The steering column assembly of claim 3, wherein an input control feature is a stalk attached to a mounting bracket operatively coupled to the jacket assembly.

\* \* \* \* \*